United States Patent
Mardani et al.

(10) Patent No.: US 11,454,705 B2
(45) Date of Patent: Sep. 27, 2022

(54) TRACKING SYSTEM AND METHOD FOR CHARACTERIZING TARGET HEIGHT USING PERCENTAGE OF RANGE BINS

(71) Applicant: Veoneer US, LLC, Wilmington, DE (US)

(72) Inventors: Reza Mardani, Quincy, MA (US); Florian Trompeter, Hammelburg (DE); Tony Chan, Somerville, MA (US); Eric Stark Willmann, Lowell, MA (US); Eduardo Martony, Lowell, MA (US); Etty J. Lee, Lowell, MA (US)

(73) Assignee: Veoneer US, LLC, Wilmington, DE (US)

( * ) Notice: Subject to any disclaimer, the term of this patent is extended or adjusted under 35 U.S.C. 154(b) by 275 days.

(21) Appl. No.: 16/692,699

(22) Filed: Nov. 22, 2019

(65) Prior Publication Data

US 2020/0271757 A1    Aug. 27, 2020

Related U.S. Application Data

(60) Provisional application No. 62/809,243, filed on Feb. 22, 2019.

(51) Int. Cl.
*G01S 7/41*    (2006.01)
*G01S 7/292*   (2006.01)
(Continued)

(52) U.S. Cl.
CPC ............ *G01S 7/415* (2013.01); *G01S 7/2927* (2013.01); *G01S 7/414* (2013.01); *G01S 13/5244* (2013.01); *G01S 13/931* (2013.01)

(58) Field of Classification Search
CPC ........ G01S 7/415; G01S 7/2927; G01S 7/414; G01S 13/5244; G01S 13/931;
(Continued)

(56) References Cited

U.S. PATENT DOCUMENTS 7,623,061 B2    11/2009    Spyropulos et al.
8,149,158 B2     4/2012    Samukawa et al.
(Continued)

FOREIGN PATENT DOCUMENTS

DE    102010007415 A1    9/2010
WO       2011070426       6/2011

OTHER PUBLICATIONS

IPRP based on International Application No. PCT/US2019/067106 dated Aug. 10, 2021.

*Primary Examiner* — Donald H B Braswell
(74) *Attorney, Agent, or Firm* — Burns & Levinson LLP; Steven M. Mills

(57) ABSTRACT

A system and method characterizes the height of targets in an environment around a vehicle. Signals are transmitted into the environment and return signals are received to determine a track corresponding to a target. For each track, bins are generated, each bin corresponding to a segment of the range, the segments having a gradually increasing size between the minimum range and maximum range. Range and magnitude values of the received return signals are determined for a selected track. A plurality of filled bins are determined, filled bins indicating that a return signal within the selected track has a range value falling within the segment corresponding to said bin. When the number of filled bins exceeds a set threshold, the return signals having range values within the segments corresponding to the filled bins are analyzed to characterize a height of the target.

16 Claims, 6 Drawing Sheets

(51) Int. Cl.
*G01S 13/931* (2020.01)
*G01S 13/524* (2006.01)
(58) Field of Classification Search
CPC ............... G01S 7/356; G01S 2013/462; G01S 2013/93271; G01S 7/354; G01S 13/46
See application file for complete search history.

(56) References Cited

U.S. PATENT DOCUMENTS

| | | | |
|---|---|---|---|
| 2010/0109938 A1* | 5/2010 | Oswald | G01S 13/522 |
| | | | 342/90 |
| 2010/0114416 A1* | 5/2010 | Au | G05D 1/027 |
| | | | 701/23 |
| 2010/0207806 A1* | 8/2010 | Takahashi | G01S 13/106 |
| | | | 342/109 |
| 2011/0006941 A1 | 1/2011 | Samukawa et al. | |
| 2013/0002470 A1* | 1/2013 | Kambe | G01S 13/931 |
| | | | 342/55 |
| 2013/0093614 A1 | 4/2013 | Tokoro | |
| 2013/0251194 A1* | 9/2013 | Schamp | G06T 7/11 |
| | | | 382/103 |
| 2018/0259634 A1* | 9/2018 | Okamoto | G01S 13/931 |
| 2020/0225337 A1* | 7/2020 | Kishigami | G01S 13/426 |
| 2021/0382144 A1* | 12/2021 | He | G01S 7/4808 |

* cited by examiner

TRACKING SYSTEM AND METHOD FOR CHARACTERIZING TARGET HEIGHT USING PERCENTAGE OF RANGE BINS

CROSS REFERENCE TO RELATED APPLICATIONS

This application claims priority to and the benefit of U.S. Provisional Patent Application No. 62/809,243, filed on Feb. 22, 2019 and titled "AUTOMOTIVE RADAR SYSTEM AND METHOD USING MULTIPATH TARGET HEIGHT ESTIMATION", the contents of which are incorporated herein by reference as though fully set forth herein.

FIELD OF THE TECHNOLOGY

The subject disclosure relates to object detection and more particularly to a detection system and method for vehicles which characterizes target height.

BACKGROUND OF THE TECHNOLOGY

Vehicles often include detection systems which can be used for collision avoidance, self-driving, cruise control, and the like. These detections systems collect and process data on targets in the surrounding environment to characterize the target and determine whether a collision is likely. As such, quickly processing collected data once the system has obtained enough data for a sufficient sample size is crucial to the accurately characterizing targets. Unfortunately, many detection systems require a large range of input data to characterize targets, and therefore targets cannot be accurately characterized until the targets have already been tracked for a significant distance, when the target is closer to the vehicle (leaving less time for the driver, or driving system, to make a decision on how to react). Further, such systems tend to continually process all data collected, requiring a large amount of processing power and increasing system costs.

SUMMARY OF THE TECHNOLOGY

In light of the needs described above, in at least one aspect, the subject technology relates to a detection system and method for characterizing targets that is able to accurately characterize targets based on a more limited amount of input data and selectively determine when data should be processed, and which data should be processed in what order, to limit the need for a more robust processing system. Further, it at least one aspect, the subject technology provides an accurate height estimation equation based on the two-ray ground-reflection model.

In at least one aspect the subject technology relates to a method of characterizing height of targets in an environment around a vehicle. In step a) a range is determined from a minimum range to a maximum range within which targets will be characterized. In step b) a plurality of signals are transmitted into the environment such that the signals reflect off the targets in the environment to create a plurality of return signals. In step c) for at least one of the targets in the environment, the return signals are received to determine a track corresponding to said target. In step d) for each track, a plurality of bins are generated, each bin corresponding to a segment of the range such that the entire range is accounted for, the segments having a gradually increasing size between the minimum range and maximum range. In step e), during a cycle, a range value and a magnitude value of the received return signals are determined for a selected track of the tracks. In step f) a plurality of filled bins are determined during the cycle, filled bins indicating that a return signal within the selected track has a range value falling within the segment corresponding to said bin during the cycle. In step g) when the number of filled bins exceeds a set threshold, the return signals having range values within the segments corresponding to the filled bins are analyzed to characterize a height of the target corresponding to the selected track.

In some embodiments, the method also includes step h) of classifying the target based on the height of the target corresponding to the selected track to generate a target classification. In some embodiments, the target classification relates to whether a collision between the target and the vehicle is expected. In some cases, a priority level is assigned to each track. Steps e)-h) can then be repeated for a plurality of selected tracks. Further, during step e), a scheduler determines the selected track at any given time based on the priority level of the tracks. In some cases, at least one target is associated with a lane of the vehicle and the track corresponding to said target has a relatively high priority level. Further, at least one target is associated with a lane separate from the lane of the vehicle and the track corresponding to said target has a relatively low priority level.

In some embodiments, the set threshold of filled bins is between 20 to 30 percent of a total number of bins. In some cases, during step g), analyzing the return signals having range values within the segments corresponding to the filled bins to characterize a height of the target corresponding to the selected track includes performing a fast Fourier transform (FFT) on a cumulative averaged product of a magnitude value and a range value of each return signal having a range value falling within the segments corresponding to the filled bins to generate an FFT output. Further, during step g), analyzing the return signals having range values within the segments corresponding to the filled bins to characterize a height of the target corresponding to the selected track can include selecting a peak FFT bin of the filled bins having the greatest FFT output and characterizing the height of the target based on the FFT output in the peak FFT bin. Further, step g) can also include identifying at least one empty bin between two surrounding filled bins and filling the empty bin through linear interpolation such that the empty bin becomes a filled bin with a magnitude value between the magnitude values of the return signals corresponding to the surrounding bins.

In at least one aspect, the subject technology relates to a detection system for characterizing height of targets in an environment around a vehicle. The detection system includes a transmitter configured to transmit a plurality of signals into the environment such that the signals reflect off targets in the environment to create return signals. A receiver is configured to receive the return signals. A processing module is connected to a memory configured to, for a given cycle, store a range from a minimum range to a maximum range within which targets will be characterized. The module is configured to determine a selected track corresponding to a target in the environment. The module is configured to, for the selected track, store data related to a plurality of bins, each bin corresponding to a segment of the range such that the entire range is accounted for, the segments having a gradually increasing size between the minimum range and maximum range. The module is configured to determine a range value and magnitude value of the received signals for the selected track during the cycle. The module is configured to determine a plurality of filled bins during the cycle, filled bins indicating that a return signal within the selected track has a range value falling within the segment corresponding to said bin. The processing module is configured to, when the number of filled bins exceeds a set threshold, analyze the return signals having range values corresponding to the segments the filled bins to characterize a height of the target within the selected track.

In some embodiments the processing module is further configured to classify the target based on the height of the target corresponding to the selected track to generate a target classification. In some cases, the target classification relates to whether a collision between the target and the vehicle is expected. The processing module can be further configured to assign a priority level to each track. A plurality of cycles for a plurality of selected tracks can then be repeated and the detection system can include a scheduler configured to determine the selected track at any given time based on the priority level of the tracks. In some embodiments, at least one target is associated with a lane of the vehicle and the scheduler assigns the track corresponding to said target a relatively high priority level. At least one target is then associated with a lane separate from the lane of the vehicle and the scheduler assigns the track corresponding to said target a relatively low priority level.

In some embodiments, the set threshold of filled bins is between 20 to 30 percent of a total number of bins. The processing module can be further configured to analyze the return signals by performing an FFT on a cumulative averaged product of a magnitude value and a range value of each return signal having a range value falling within the segments corresponding to the filled bins to generate an FFT output. In some cases, the processing module is further configured to analyze the return signals by selecting a peak FFT bin of the filled bins having the greatest FFT output and characterizing the height of the target based on the FFT output in the peak FFT bin. In some embodiments the processing module is further configured to identify at least one empty bin between two surrounding filled bins and filling the empty bin through linear interpolation such that the empty bin becomes a filled bin with a magnitude value between the magnitude values of the return signals corresponding to the surrounding bins.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
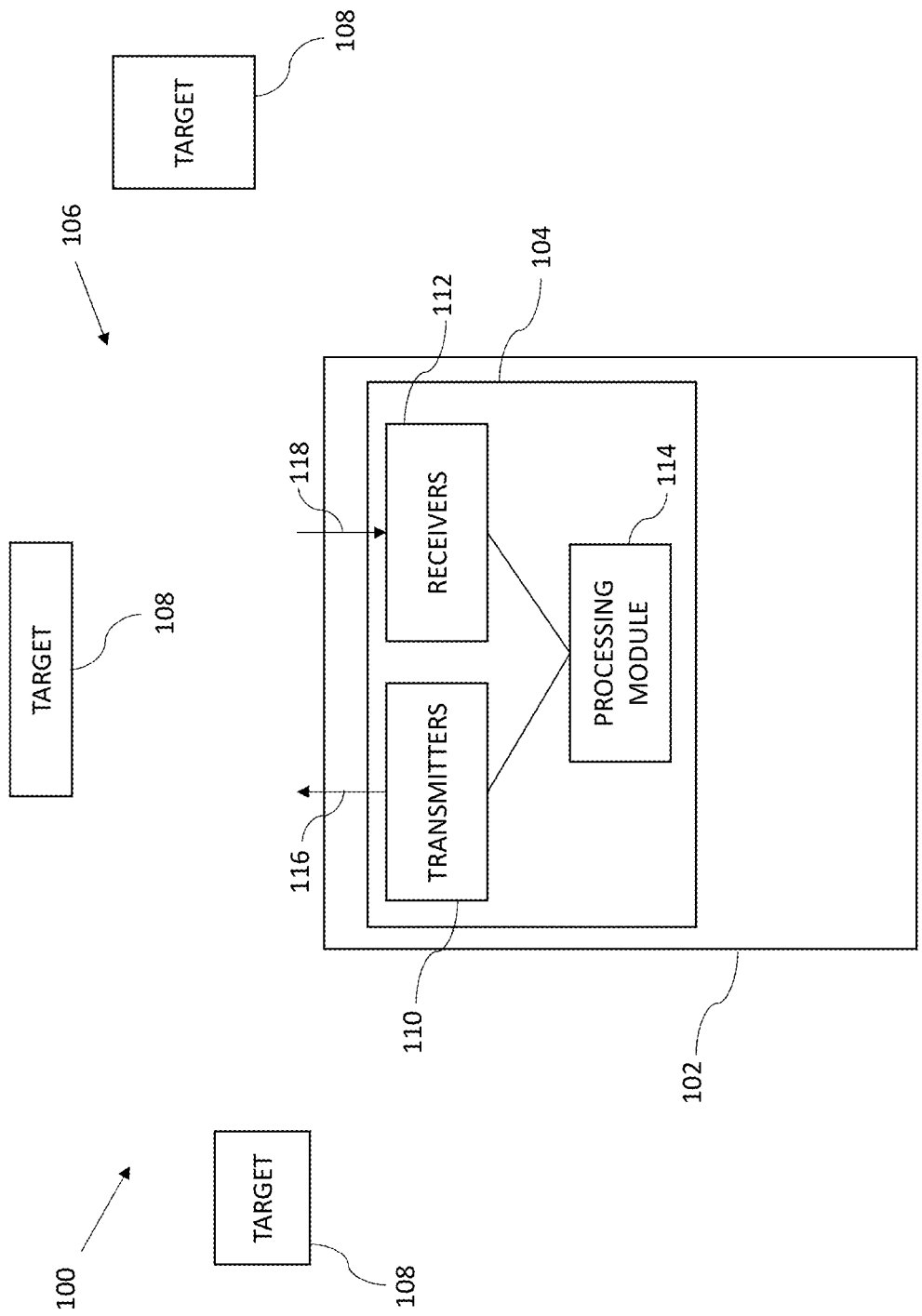
FIG. 1 is an overhead view of a detection system for a vehicle in accordance with the subject technology.

The subject technology overcomes many of the prior art problems associated with vehicle detection systems. In brief summary, the subject technology provides a detection system that detects targets in the surrounding environment and organizes and processes detection data for more efficient and accurate target characterization. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1 a block diagram of a vehicle 102 with a simplified detection system 104 is shown generally at 100. The vehicle 102 is traveling through an environment 106 which includes a number of targets 108. The vehicle 102 has a detection system 104 which includes the necessary components for detecting the targets 108 within the environment 106 around the vehicle 102. To that end, the detection system 104 includes transmitters 110, receivers 112, and a processing module 114. The transmitters 110 are configured to transmit a plurality of signals 116, such as typical radar signals, into the environment 106 across an azimuth range and an elevation range, defining the field of view for the detection system 104. The signals 116 reflect off targets 108 in the environment 106 and are returned to the vehicle 102, the return signals 118 being received by the receivers 112. The processing module 114 can include a processor connected to or including memory, and generally, any other necessary components for carrying out the functions of the processing module, or the processing functions of the detection system as a whole, such as individual application specific integrated circuits or multiple separate processors and/or memory banks. The processing module 114 communicates with the transmitters 110 and receivers 112 to facilitate the transmission of the signals 116, and receives and stores data related to the return signals 118 and the detection process generally. The received return signals 118 are processed and relevant detection data is stored in the processing module, such as a magnitude of each return signal 118 and range of the corresponding target 108 as derived from the return signal 118. The detection system 104 can include other components for transmitting, receiving, processing and storing the signals, and detecting objects generally, as are known in the art.

Figure 2:
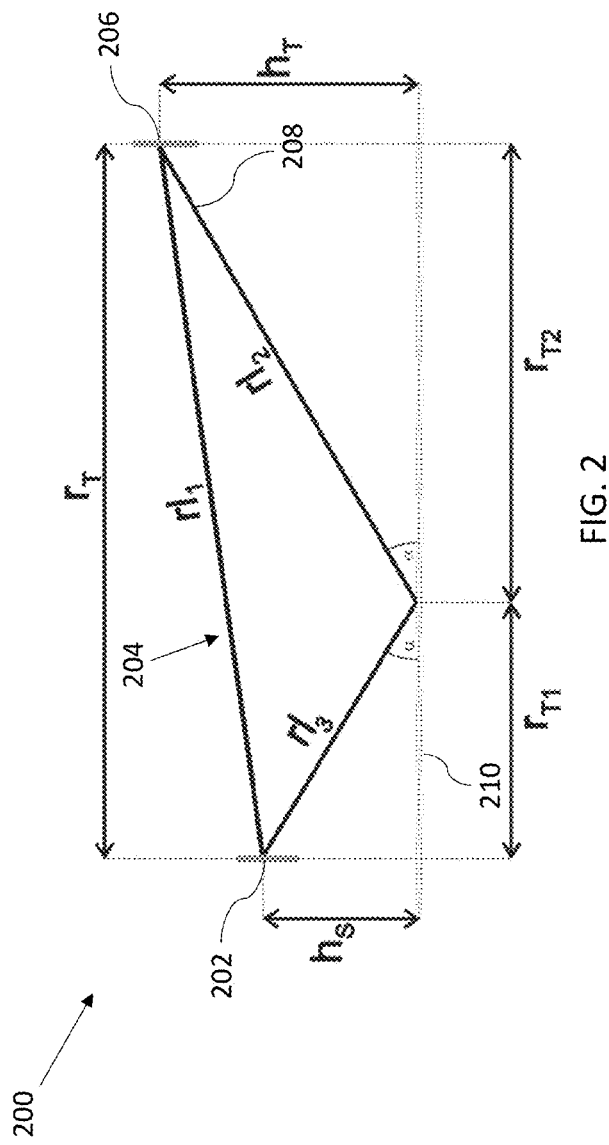
FIG. 2 is an exemplary view of transmitted and returning signals as part of a detection system in accordance with the subject technology.
Figure 3B:
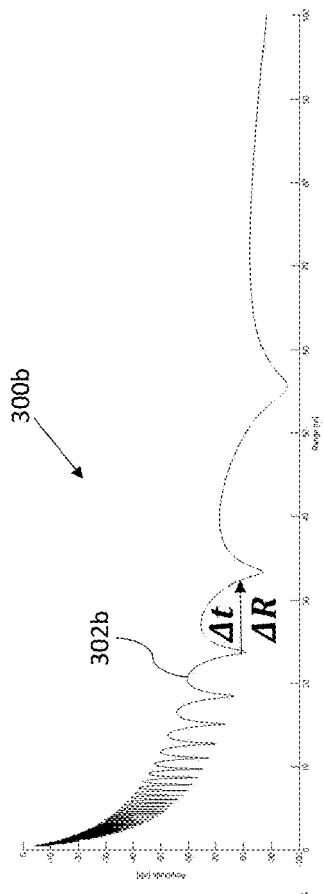
FIGS. 3a-3d are graphs of return signal amplitude by range for a detection system in accordance with the subject technology.
Figure 3D:
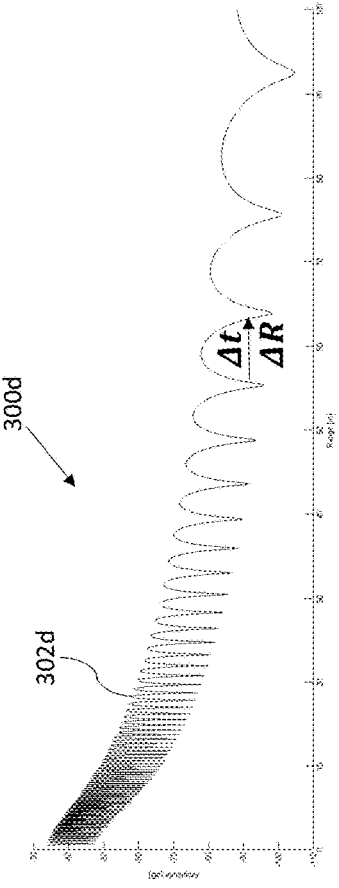
Figure 3A:
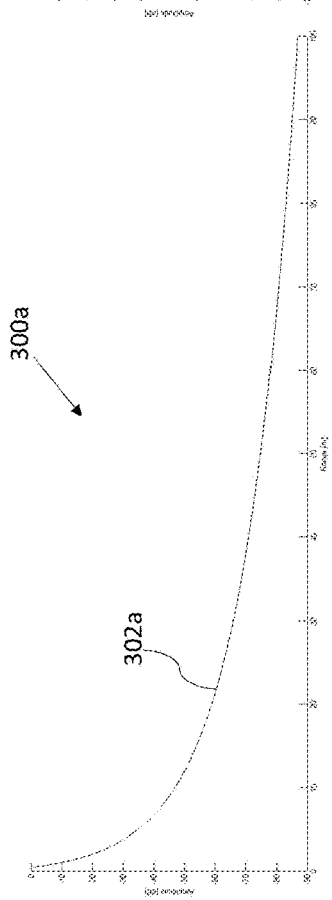
Figure 3C:
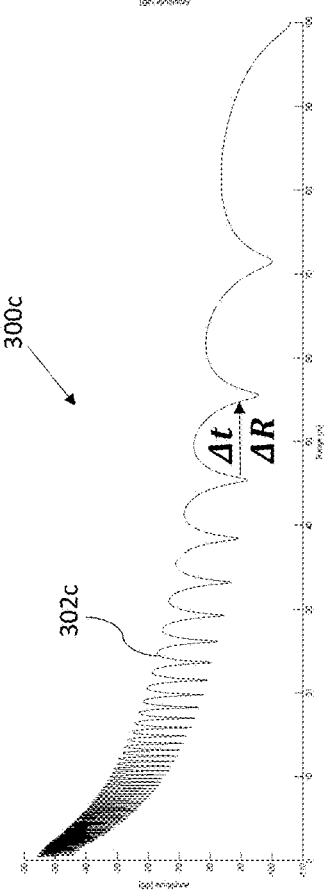

Referring now to FIG. 2, a side view of exemplary paths of transmitted and returning signals is shown generally at 200, which can be used to calculate radar and target heights and range, as discussed below. In particular, a detection system 202 for a vehicle, which can be similar to the detection system 104 described above, includes transmitters and receivers. The transmitters transmit a plurality of signals 204 into the environment around the vehicle. At least some of the transmitted signals 204 encounter the target 206, and are reflected off the target 206 to return to the detection system 202 as return signals. While some of the return signals take a return path directly from the target 206 to the detection system 202 (path 204), other signals (e.g. signals 208) take indirect paths. In the example shown, some of the return signals 208 reflect off the ground 210 in between the target 206 and the detection system 202 before returning to the detection system 202. This is known as multipath, which causes unique patterns to be formed in the amplitude of the return signal at different ranges for a given target 206.

To that end, referring now to FIG. 3a-3d, graphs 300a-300d (generally 300) of return signal amplitude by range are shown. The graph lines 302a-302d (generally 302) represent typical amplitude signals for detection of a track of a target over a given range when the return signals are experiencing multipath. The target being tracked in each graph 300 is at a different height. In particular, the target of graph 300a is at ground level, the target of graph 300b is at one meter, the target of graph 300c is at three meters, and the target of graph 300d is at four meters. Based on the null spacing of the graph lines 302, the height of each target can be determined. Various methods for determining target height based on null spacing are known in the art. In general, the frequency of the magnitude nulls can be measured, with higher frequencies relating to higher targets and lower null frequencies related to lower targets. As can be seen, the magnitude null frequency can be seen progressively increasing from graph 300a-300d as the target height is higher, with graph 300d having the highest frequency. Certain known methods of characterizing target height based on null spacing are discussed in further detail below, particularly with reference to their use in accordance with the subject technology, the subject technology improving on prior methods of characterizing target height.

Figure 4:
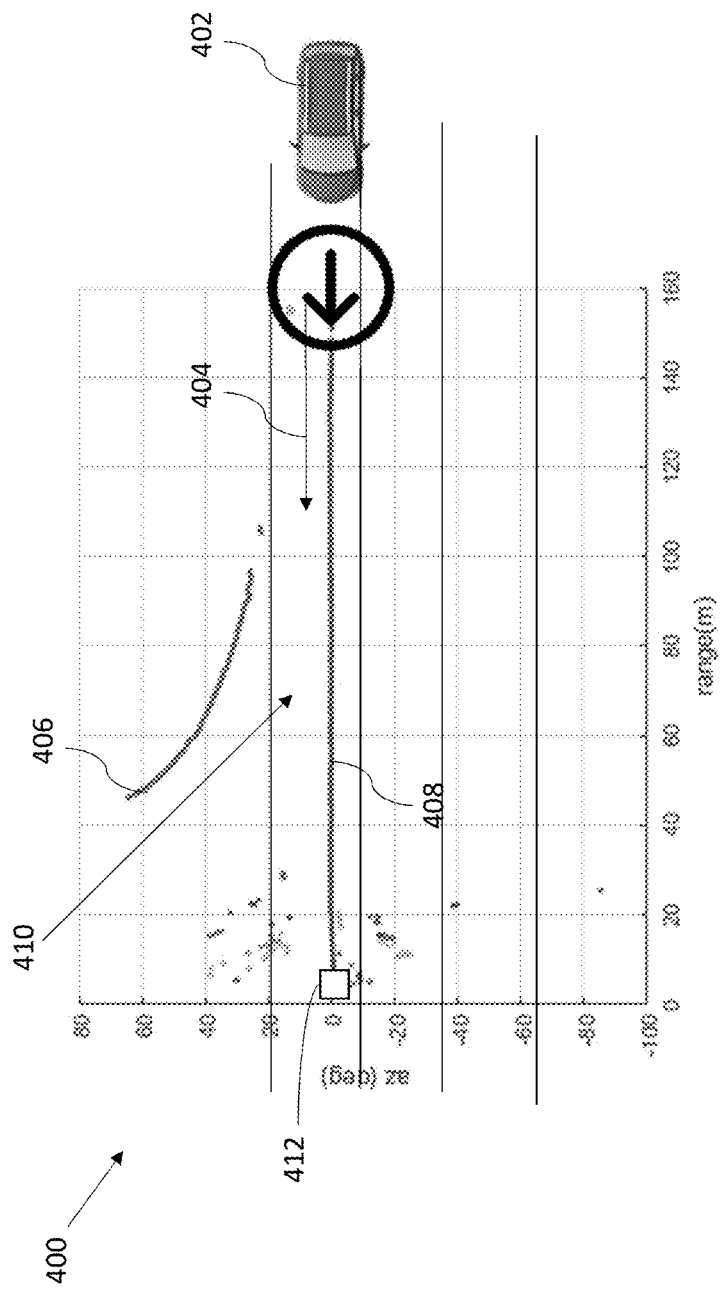
FIG. 4 is an exemplary graph of tracks, showing return signal angle in the azimuth direction by range of the return signal received, in accordance with the subject technology.

Referring now to FIG. 4, a graph of a detection track in accordance with the subject technology is shown generally at 400. In particular, the area on the graph 400 represents the environment, with the y-axis depicting the azimuth field of vision around the vehicle 402 in degrees and the x-axis depicting a range distance from the vehicle 402. With respect to the y-axis, 0 degrees represents the boresight of the detection system, with the negative degrees representing environment on the left side of the vehicle 402 and the positive degrees in azimuth representing environment on the right side of the vehicle 402. For example, the field of view for a detection system with 140 degrees of azimuth range would cover the area between −70 degrees and 70 degrees in y-axis.

As the vehicle 402 travels in a straight path 404, detection tracks are created of the targets in the environment. A first track 406 shows a stationary target that is to the right of the vehicle 402. The target is first detection at just over 20 degrees of azimuth range, at a point when the vehicle is roughly 105 m from the origin of the x-axis of the graph 400. As the vehicle 402 approaches and passes the target, as shown by the track 406, the azimuth angle becomes greater until the object is no longer within the field of view of the detection system, at around 70 degrees in azimuth. This occurs at a range of roughly 45 m from the origin of the x-axis. Another track 408 is created for an object 412 directly in front of the vehicle 402. As such, this track 408 is directly at the boresight of the detection system, and remains there at all times as the vehicle 402 travels towards the x-axis origin of 0 m. Often, however, objects such as object 412 will be on a collision course with the vehicle 402 in the azimuth direction, but will be at an elevation that is too high or low to present a concern for a collision, and therefore be of relatively low importance to the detection system. For example, a high overhead bridge might appear directly in front of the vehicle 402 in azimuth but does not present any need for action on the part of the detection system. As a track is generated for a given target, the detection system organizes the data for the return signals into bins, as discussed in more detail below, to help process the data and characterize whether tracks relate to a target of concern.

Figure 5A:
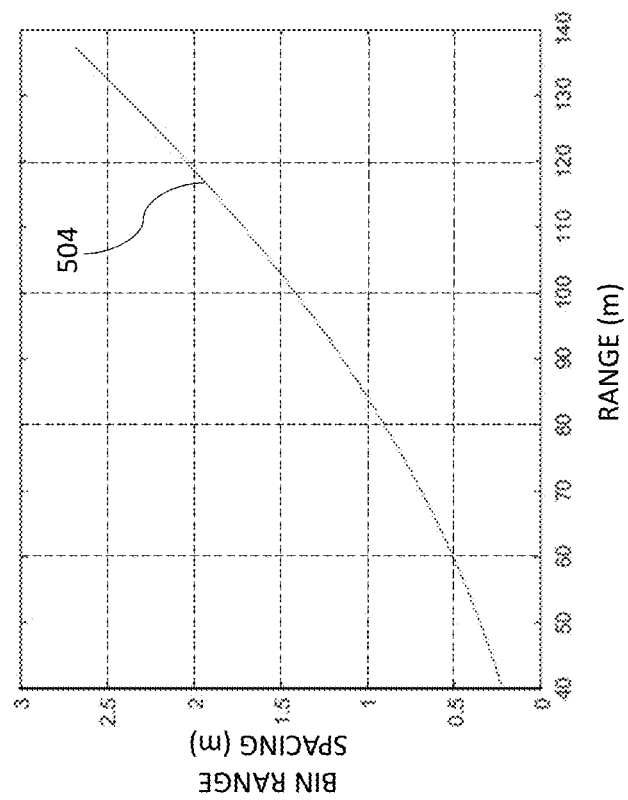
FIG. 5a is an exemplary graph of return signal bin assignments by range, in accordance with the subject technology.

Referring now to FIG. 5a, an exemplary graph of collected data over a time period for a target track organized into range bins is shown, plotting boundary range versus range bin number. In this example, the track 502 is organized into 128 bins, numbered from 0 to 127, for a detection system characterizing targets in a range between a minimum range of 40 m and a maximum range of 140 m. As cycles of signal transmissions and receipt of return signals for each track are carried out, data on the magnitude of the return signal and the range of target as determined from the return signal is stored for that track. The track data is divided into a plurality of bins based on the range of the return signal. Each bin contains the data for a set segment of the range of the detection system. For example, bin number one might include the data for return signals between 40.0 meters and 40.2245 meters. However, in some cases, the subject technology uses a specific algorithm for determining which range corresponds to which bin number which is discussed in more detail below. Nevertheless, simplified examples are also provided herein for each of explanation of the subject technology.

Graph line 502 represents the classification of data for an exemplary track into bins based on the range of the return signals for that track, where the y-axis of the graph represents the range of a given return signal and the x-axis of the graph representing the bin within which that return signal is classified. While the graph line 502 is shown as a smooth line for simplicity, it should be understood that only whole numbered bins exist, (i.e. bin number 1, 2, 3 etc.), with data being organized into the most appropriate whole numbered bin based on the boundaries for that bin. For example, bin number 100 could encompass the segment of the range which includes return signals between 88-90 m in range. Return signals with a range of just under 88 m would be placed into bin 99, while return signals with a range of just over 90 m would be placed into bin 101.

Figure 5B:
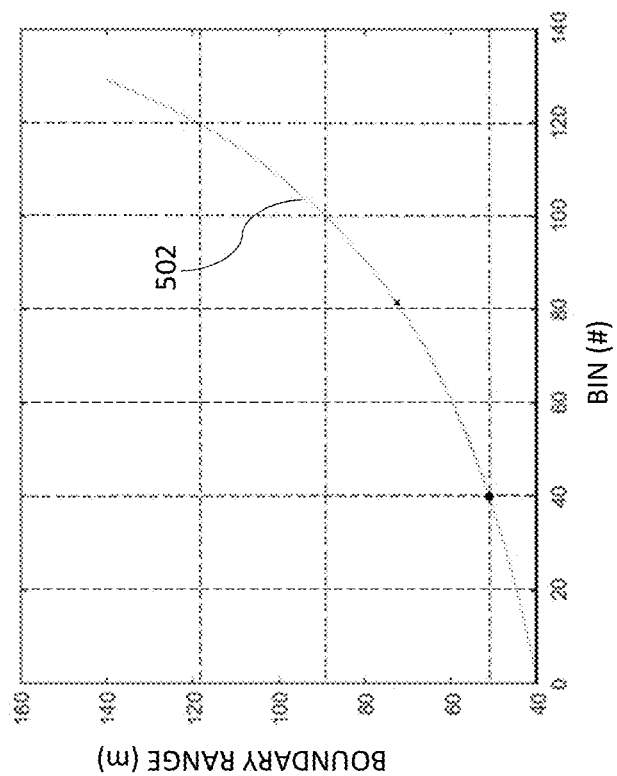
FIG. 5b is an exemplary graph of bin range spacing at different ranges, in accordance with the subject technology.

As shown by the slope of the graph line 502, the segment of the range that each bin accounts for gradually increases in size as the bins are assigned range values between the minimum and maximum range. In other words, closer to the minimum range of 40 m, the bins cover a much smaller segment of the range than the segment covered by the bins closer to the maximum range (maximum range can be assumed to be 140 m in this example). This is done because the null and magnitude peak frequency increases for ranges closer to the vehicle. Moreover, there is more data typically available at ranges closer to the vehicle. For example, bins 0-40 cover the range of about 40-51 m (11 m of range divided into 40 bins), while bins 100-120 cover the range of about 91-118, roughly (27 m of range divided into 20 bins). This is further illustrated in FIG. 5b, the graph line 504 showing the bin spacing between bins at each range for the data depicted by the graph line 502 of FIG. 5a. In FIG. 5b, the bin range spacing is shown on the y-axis, with range values shown on the x-axis. Therefore the graph line 504 shows, with respect to the track in question, how the bin range spacing increases the closer the range of the detected return signal is to the maximum range, and the further from the minimum range. Closer to the minimum range of 40 m, bins covering segments within that range correspond to segments of less than 0.5 meters of range. Conversely, closer to the maximum range of 140 m, bins covering segments within that range correspond to segments of greater than 2.5 m of range. The detection system follows this pattern, of gradually increasing the segment of the range each bin corresponds to, for all detection data. Notably, range for each bin can be given by equation (9), discussed in more detail below.

The detection system stores a value for each return signal in the correct bin based on the range value of the return signal. The stored value within each bin is initially the product of the magnitude and range of each return signal detection (later, additional processing be done, such as performing a faster Fourier transform (FFT) on that value, as discussed in more detail below). If multiple returns fall in a given bin then the product of the magnitude and range for those returns is averaged. Thus, the final value stored in each bin is the average of all magnitude and range products for each return signal with a range falling within that bin. This is referred to as the cumulative averaged product of the magnitude value and range value of each return signal within a bin.

As the vehicle travels, the detection system generates tracks from the detected data, as graphically represented by FIGS. 5a-5b and discussed above. Each track has its own corresponding set of bins and binned data from return signals. The system waits until enough data has been collected on a given track before taking further processing steps, such as utilizing the processing module to analyze the return signals to characterize the target corresponding to the track. One way to analyze the signals is by performing an FFT on the collected data for that track to determine the elevation of the object, and to determine whether the vehicle should expect a collision. Performing FFTs, and other methods of analyzing the data, takes a significant amount of processing power, and it is impractical for the system to characterize target height any time any data is collected. Therefore, the detection system, in accordance with the subject technology, only takes action to analyze the return signals when the number of filled bins exceeds a set threshold. Bins are considered "filled" when they have a value for a return signal within that track which has a range that falls in the range segment corresponding to that bin. For example, if bin 100 covers the range of 88-90 m, bin 100 will be considered "filled" when the detection system has received at least one return signal from a range of 88-90 m for that track. In some cases, if desired, a bin can also be filled by averaging the value of surrounding bins. For example, if bin 100 is empty for a given track (i.e. no return signal has a range within the segment covered by bin 100), but bins 99 and bins 101 are both filled, the values in bins 99 and 101 can be averaged and the averaged value can be used to fill bin 100.

The threshold value that triggers analysis of the return data can be a set number of bins, or can be a percent of the total number of bins. For example, in some cases, a threshold values of between 20-30 percent of the total number of bins or 25 percent of the total number of bins have been found to be advantageous. Thus, for the detection system generating the track of FIG. 5a, which uses 128 bins, a threshold value of 32 filled bins has been found to be effective. After 32 bins have been filled, the detection system has enough data to accurately characterize the target represented by the track, and can therefore start analyzing detection data of the return signals within that track. Notably, a scheduler can be employed to assign priority levels between the tracks to determine which track to analyze first. In such a case, the scheduler can give higher priority to tracks which are in the lane of the vehicle (e.g. tracks of lane 410 of FIG. 4), meaning those corresponding targets will be characterized first, and lower priority to tracks which are out of the lane of the vehicle. For example, the scheduler could assign the track 406 of FIG. 4 a lower priority than track 408, since track 408 is within lane 410 and at boresight in the azimuth direction and therefore creates a risk of a collision with the vehicle 402 depending on the height of the corresponding target.

Analyzing the return signals within the filled bins after the filled bins have exceeded the set threshold can be done by applying an FFT to the return signal data. More specifically, an FFT can be performed on the cumulative averaged product of the magnitude and range values of each return signal corresponding to the filled bins. Based on the FFT output (or FFT output frequency bins), a number of different methods can then be employed to characterize the height of the target, and optionally to classify the target at a level of concern for collision. For example, rules can be employed which characterize or classify the target based on the peak of the FFT output, by comparing FFT output for different groups of FFT output bins, and/or for constructing specific rules for ground targets and high speed targets. By using a flexible rules based system, rules can be adjusted as practical and feasible for a given implementation of the subject technology. A determination of quality can also be calculated, where a quality is assigned to a given characterization or classification based on the reliability of the calculation. This can be based on the total number, or percentage, of filled bins used in the analysis process. In one example, the following quality thresholds have been found to be advantageous. When below 25% of the bins are filled, the system is not ready to process the data. When between 25% and 50% of the bins are filled, the system will process the data, but a low quality is assigned to the final characterization. When between 50% and 75% of the bins are filled, a medium quality is assigned to the final characterization. When above 75% of the bins are filled, a high quality is assigned to the final characterization. The quality indication can then be relied upon by a driver (or the vehicle) to make the appropriate response to the target.

A more detailed explanation of target height and bin spacing calculations in accordance with one embodiment of the subject technology is now provided. It is known that the path difference in a two-ray ground-reflection model (FIG. 2) can be expressed as radar and target heights and range and used to estimate target height ($h_T$) as follows:

$$\text{Path Difference } \Delta r \approx \frac{2h_s h_T}{r_T} \quad (1)$$

$$\text{Phase Difference } \Phi = \frac{2\pi \Delta r}{\lambda} \approx \frac{2\pi}{\lambda} \frac{2h_s h_T}{r} = \frac{4\pi h_s h_T}{\lambda r} \quad (2)$$

In equation (2), as an example, RF wavelength=$\lambda$ wavelength=speed of light/(77 GHz)=0.00389 m. Notably, the detection system organizes the data for the return signals into bins based on the range of the corresponding target, as discussed in more detail below. Based on the two-ray model, it is assumed that the spacing between range bins of data (discussed in more detail below) is proportional to $r^2$ range boundary spacing, thus range bin spacing is described as equal to $kr^2$.

The bin range is given as r and the corresponding bin number (N) has the following relationship:

$$\frac{dr}{dN} = kr^2 \qquad (3)$$

The variables are separated and an integration is performed as follows:

$$\frac{dr}{r^2} = kdN \rightarrow \frac{-1}{r} = kN + C \qquad (4)$$

The parameters K and C are determined based on boundary conditions of the given system. For Nmax bins given between range $r_1$ and $r_2$, when bin N=1 and $r=r_1$, equation (4) yields:

$$\frac{-1}{r_1} = k + C \qquad (5)$$

When N=Nmax and $r=r_2$, equation (4) yields:

$$\frac{-1}{r_2} = k N\max + C \qquad (6)$$

The variables are then separated and in integration is formed. Based on equations (5) and (6), it follows that:

$$k = \frac{\frac{1}{r_1} - \frac{1}{r_2}}{N\max - 1} \qquad (7)$$

$$C = \frac{-\frac{1}{r_1}N\max + \frac{1}{r_2}}{N\max - 1} \qquad (8)$$

Range for each bin can then be given by the following:

$$r(N) = \frac{-1}{\left(\frac{1}{r_1} - \frac{1}{r_2}\right)\left(\frac{N-1}{N\max - 1}\right) + \frac{-\frac{1}{r_1}N\max + \frac{1}{r_2}}{N\max - 1}} \qquad (9)$$

Equation (9) then can be simplified to:

$$r(N) = \frac{-1}{\left(\frac{1}{r_1} - \frac{1}{r_2}\right)\left(\frac{N-1}{N\max - 1}\right) - \frac{1}{r_1}} \qquad (10)$$

The range covered by each individual bin, where N is a bin value from 1 to Nmax+1, is the range between a set minimum ($R_{mm}$) and set maximum ($R_{max}$) which is given by the equation:

$$r(N) = \frac{-1}{\left(\frac{1}{R_{min}} - \frac{1}{R_{Max}}\right)\left(\frac{N-1}{N\max - 1}\right) - \frac{1}{R_{min}}} \qquad (11)$$

The output of the FFT applied in accordance with the subject technology can be given as (where max_bin_number=1, . . . , Nmax):

$$\frac{d\Phi}{dN} = \frac{2\pi * \max\_bin\_number}{N\max} \qquad (12)$$

In equation (12), the FFT output frequency is in rad/sample. Target height estimation, in accordance with the subject technology, can then be given by the chain rule equation, expressed as:

$$\frac{d\Phi}{dN} = \left|\frac{d\Phi}{dr}\right| \cdot \frac{dr}{dN} \qquad (13)$$

The frequency output in equation (12) is chosen to be positive. Further, the spatial frequency $$\left(\left|\frac{d\Phi}{dr}\right|\right)$$

is positive and the instantaneous bin spacing $$\left(\frac{dr}{dN}\right)$$

is also always positive.

Equation (2) above can now be utilized so that the following is true:

$$\frac{d\Phi}{dr} = \frac{-4\pi h_s h_T}{\lambda r^2} \qquad (14)$$

The absolute value of equation (14) can then be given as:

$$\left|\frac{d\Phi}{dr}\right| = \frac{4\pi h_s h_T}{\lambda r^2} \qquad (15)$$

Where equations (2) and (3) are true:

$$\frac{2\pi * \max\_bin\_number}{N\max} = \frac{4\pi h_s h_T}{\lambda r^2} * \frac{\frac{1}{r_1} - \frac{1}{r_2}}{N\max - 1} * r^2 \qquad (16)$$

With the minimum range set ($R_{min}$) and maximum range set ($R_{max}$) set for the range being observed, the target height can be estimated based on the two-ray model equation:

$$h_T = \frac{\lambda * \max\_bin\_number}{2h_s} \cdot \frac{1}{\frac{1}{R_{min}} - \frac{1}{R_{Max}}} \cdot \frac{(N\max - 1)}{N\max} \qquad (17)$$

Figure 6:
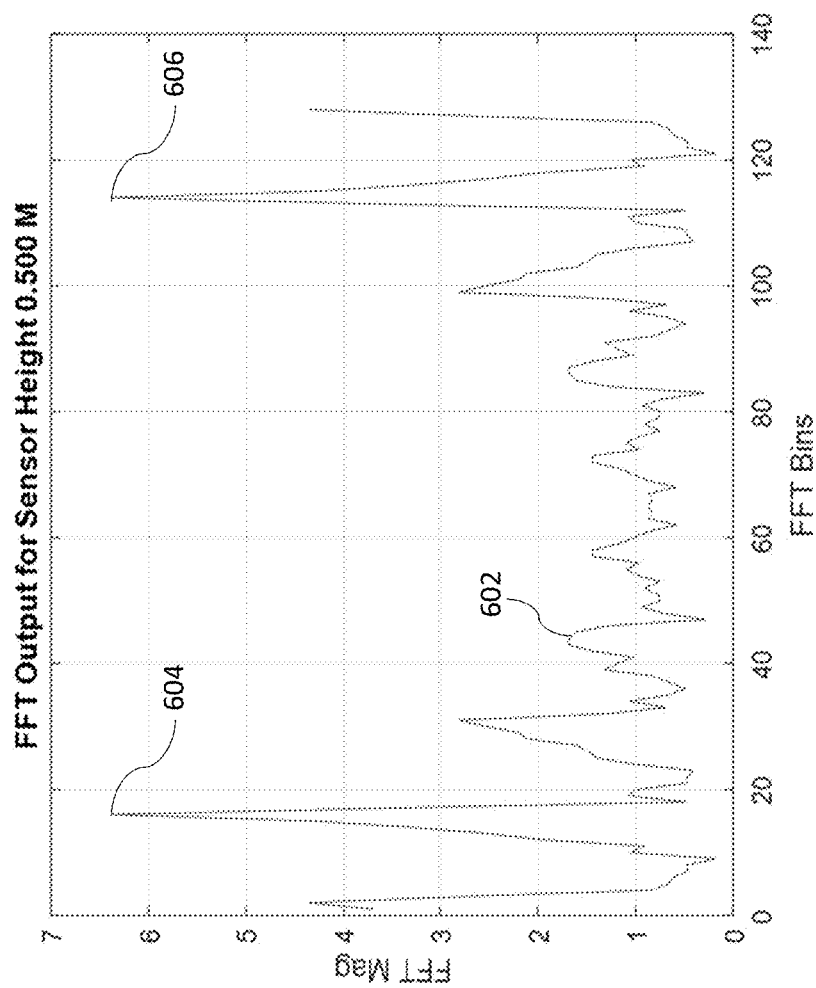
FIG. 6 is an exemplary graph of Fast Fourier Transform (FFT) output of return signal data which can be used to characterize and classify a target in accordance with the subject technology.

As such, referring now to FIG. 6, an FFT has been applied to the return signal data for the range bins on a given track and a graph line 602 shows graphically the FFT magnitude for each FFT bin (i.e. the bins now being described as containing the FFT magnitude). As discussed above, rules can now be implemented to characterize the target. In one implementation, the peak 604 of the FFT output 602 can be located and used to classify the target as over-ridable, under-ridable, or a relevant target based on the bin number to which it corresponds. Note that while there appears to be a second peak 606, this is because the detection system is symmetrical around the boresight (i.e. around bin number 65) so the second half of the data can be disregarded. In this case, the frequency bin with max magnitude relates to the target of interest. The corresponding frequency equals the multipath oscillation frequency, which is directly proportional to the target height.

In the example given, each FFT bin corresponds to a given height estimate and the relationship is given by simplifying equation (17) based on current known variables to solve for the height of target=max bin number*multipath height resolution. Multipath height resolution is a constant that can either be computed based or measured empirically for a given sensor height, wavelength, range parameters. For example, a radar sensor of 0.77 m height at 77 GHz range (40-140 m) will have a resolution of 0.15 m. The first FFT bin can then correspond to a target height of 0.15 m, bin 14 corresponds to a target height of 2.1 m, and so on. As such, these rules are applied using the peak FFT output 604 as target of interest, and if that peak FFT corresponds to a bin number over a set threshold, such as bin number 14, the target will be classified as under-ridable (e.g. a tall bridge that can be driven under without issue). If the peak 604 corresponds to a bin number under or equal to a set threshold, such as bin number 1, the target will be classified as over-ridable (e.g. a speedbump that can be driven over). Between bin 2 (corresponding to a height of over 0.15 m) and bin 12 (corresponding to a height of 1.8 m), targets will be classified as relevant targets which have the potential for a collision with the vehicle. In this case, the peak 604 corresponds to bin number 14, and therefore the target is classified as under-ridable. As such, the peak 604 of the FFT output is used to characterize and classify the target. Other rules based systems can also be implemented, as mentioned above.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A method of characterizing height of targets in an environment around a vehicle, comprising:
    a) determining a range from a minimum range to a maximum range within which targets will be characterized;
    b) transmitting a plurality of signals into the environment such that the signals reflect off the targets in the environment to create a plurality of return signals;
    c) for at least one of the targets in the environment, receiving the return signals to determine a track corresponding to said target;
    d) for each track, generating a plurality of bins, each bin corresponding to a segment of the range such that the entire range is accounted for, the segments having a gradually increasing size between the minimum range and maximum range;
    e) during a cycle, determining a range value and a magnitude value of the received return signals for a selected track of the tracks;
    f) determining a plurality of filled bins during the cycle, filled bins indicating that a return signal within the selected track has a range value falling within the segment corresponding to said bin during the cycle; and
    g) when the number of filled bins exceeds a set threshold, analyzing the return signals having range values within the segments corresponding to the filled bins to characterize a height of the target corresponding to the selected track, wherein the set threshold of filled bins is between 20 and 30 percent of a total number of bins.

2. The method of claim 1, further comprising:
    h) classifying the target based on the height of the target corresponding to the selected track to generate a target classification.

3. The method of claim 2, wherein the target classification relates to whether a collision between the target and the vehicle is expected.

4. The method of claim 3, further comprising:
    i) assigning a priority level to each track; and
    j) repeating steps e)-h) for a plurality of selected tracks, wherein, during step e), a scheduler determines the selected track at any given time based on the priority level of the tracks.

5. The method of claim 4, wherein:
    at least one target is associated with a lane of the vehicle and the track corresponding to said target has a relatively high priority level; and
    at least one target is associated with a lane separate the lane of the vehicle and the track corresponding to said target has a relatively low priority level.

6. The method of claim 1, wherein, during step g), analyzing the return signals having range values within the segments corresponding to the filled bins to characterize a height of the target corresponding to the selected track includes:
    performing a fast Fourier transform (FFT) on a cumulative averaged product of a magnitude value and a range value of each return signal having a range value falling within the segments corresponding to the filled bins to generate an FFT output.

7. The method of claim 6, wherein, during step g), analyzing the return signals having range values within the segments corresponding to the filled bins to characterize a height of the target corresponding to the selected track includes:

selecting a peak FFT bin of the filled bins having the greatest FFT output; and characterizing the height of the target based on the FFT output in the peak FFT bin.

8. The method of claim 1, wherein, step g) further comprises, identifying at least one empty bin between two surrounding filled bins and filling the empty bin through linear interpolation such that the empty bin becomes a filled bin with a magnitude value between the magnitude values of the return signals corresponding to the surrounding bins.

9. A detection system for characterizing height of targets in an environment around a vehicle, comprising:

a transmitter configured to transmit a plurality of signals into the environment such that the signals reflect off targets in the environment to create return signals;

a receiver configured to receive the return signals; and a processing module connected to a memory configured to:

for a given cycle, store a range from a minimum range to a maximum range within which targets will be characterized;

determine a selected track corresponding to a target in the environment;

for the selected track, store data related to a plurality of bins, each bin corresponding to a segment of the range such that the entire range is accounted for, the segments having a gradually increasing size between the minimum range and maximum range;

determine a range value and magnitude value of the received signals for the selected track during the cycle;

determine a plurality of filled bins during the cycle, filled bins indicating that a return signal within the selected track has a range value falling within the segment corresponding to said bin; and when the number of filled bins exceeds a set threshold, analyze the return signals having range values corresponding to the segments the filled bins to characterize a height of the target within the selected track, wherein the set threshold of filled bins is between 20 and 30 percent of a total number of bins.

10. The detection system of claim 9, wherein the processing module is further configured to classify the target based on the height of the target corresponding to the selected track to generate a target classification.

11. The detection system of claim 10, wherein the target classification relates to whether a collision between the target and the vehicle is expected.

12. The detection system of claim 11, wherein the processing module is further configured to:

assign a priority level to each track; and repeat a plurality of cycles for a plurality of selected tracks, wherein the detection system further comprises a scheduler configured to determine the selected track at any given time based on the priority level of the tracks.

13. The detection system of claim 12, wherein:

at least one target is associated with a lane of the vehicle and the scheduler assigns the track corresponding to said target a relatively high priority level; and at least one target is associated with a lane separate from the lane of the vehicle and the scheduler assigns the track corresponding to said target a relatively low priority level.

14. The detection system of claim 9, wherein the processing module is further configured to analyze the return signals by:

performing a fast Fourier transform (FFT) on a cumulative averaged product of a magnitude value and a range value of each return signal having a range value falling within the segments corresponding to the filled bins to generate an FFT output.

15. The detection system of claim 14, wherein the processing module is further configured to analyze the return signals by:

selecting a peak FFT bin of the filled bins having the greatest FFT output; and characterize the height of the target based on the FFT output in the peak FFT bin.

16. The detection system of claim 9, wherein the processing module is further configured to:

identify at least one empty bin between two surrounding filled bins and filling the empty bin through linear interpolation such that the empty bin becomes a filled bin with a magnitude value between the magnitude values of the return signals corresponding to the surrounding bins.

* * * * *

UNITED STATES PATENT AND TRADEMARK OFFICE
CERTIFICATE OF CORRECTION

| | | |
|---|---|---|
| PATENT NO. | : 11,454,705 B2 | Page 1 of 1 |
| APPLICATION NO. | : 16/692699 | |
| DATED | : September 27, 2022 | |
| INVENTOR(S) | : Reza Mardani et al. | |

It is certified that error appears in the above-identified patent and that said Letters Patent is hereby corrected as shown below:

On the Title Page

Item (71), delete "Wilmington, DE" and replace it with --Southfield, MI--.

Signed and Sealed this
Twenty-second Day of November, 2022

Katherine Kelly Vidal
*Director of the United States Patent and Trademark Office*